United States Patent

[11] 3,619,623

| [72] | Inventor | Roy W. Huston |
| | | 21 James St., Winchester, Mass. 01890 |
| [21] | Appl. No. | 753,920 |
| [22] | Filed | Aug. 20, 1968 |
| [45] | Patented | Nov. 9, 1971 |

[54] EXAMINATION OF FLUID SUSPENSIONS OF PARTICULATED MATTER
9 Claims, 10 Drawing Figs.

[52] U.S. Cl. ............................................. 250/218, 356/208, 250/222
[51] Int. Cl. ............................................. G01n 21/26
[50] Field of Search ......................................... 250/218, 238, 222, 222 M; 356/208, 39–42, 103, 104, 102, 207

[56] References Cited
UNITED STATES PATENTS

| 2,244,507 | 6/1941 | Thomas | 250/218 |
| 2,938,423 | 5/1960 | Rich | 356/207 X |
| 3,417,251 | 12/1968 | Leonard et al. | 250/218 X |
| 1,945,652 | 2/1934 | Martin | 250/238 X |
| 2,513,283 | 7/1950 | Cahusac et al. | 250/218 |
| 2,754,424 | 7/1956 | Woodhull et al. | 250/218 X |
| 2,991,688 | 7/1961 | Schneider, Jr. | 250/218 X |
| 3,185,975 | 5/1965 | Kompelien | 250/218 X |
| 3,336,481 | 8/1967 | Nelson | 250/238 X |
| 3,409,885 | 11/1968 | Hall | 356/104 X |
| 3,457,407 | 7/1969 | Goldberg | 356/103 X |

*Primary Examiner*—Walter Stolwein
*Attorney*—Stowell & Stowell

ABSTRACT: Apparatus for the examination of fluid suspensions of particulate matter includes means establishing a thermally stabilized region for containing a sample of the fluid to be examined, means for passing a beam of light into the region and means for viewing fluid in the region at an angle to the beam of light. The means defining the region may include thermal energy traps and may include thermal energy traps and may include parallel spaced members establishing a narrow thermally stabilized viewing region. The apparatus may include comparator means comprising graded reference standards which can be illuminated by an independent light source or by an independently adjustable beam from the light source which illuminates the viewing region. A photosensitive monitor, such as a photodetector cell, can be illuminated by light from the viewing region to provide a comparison with the reference standards of fluid suspensions of particulate matter.

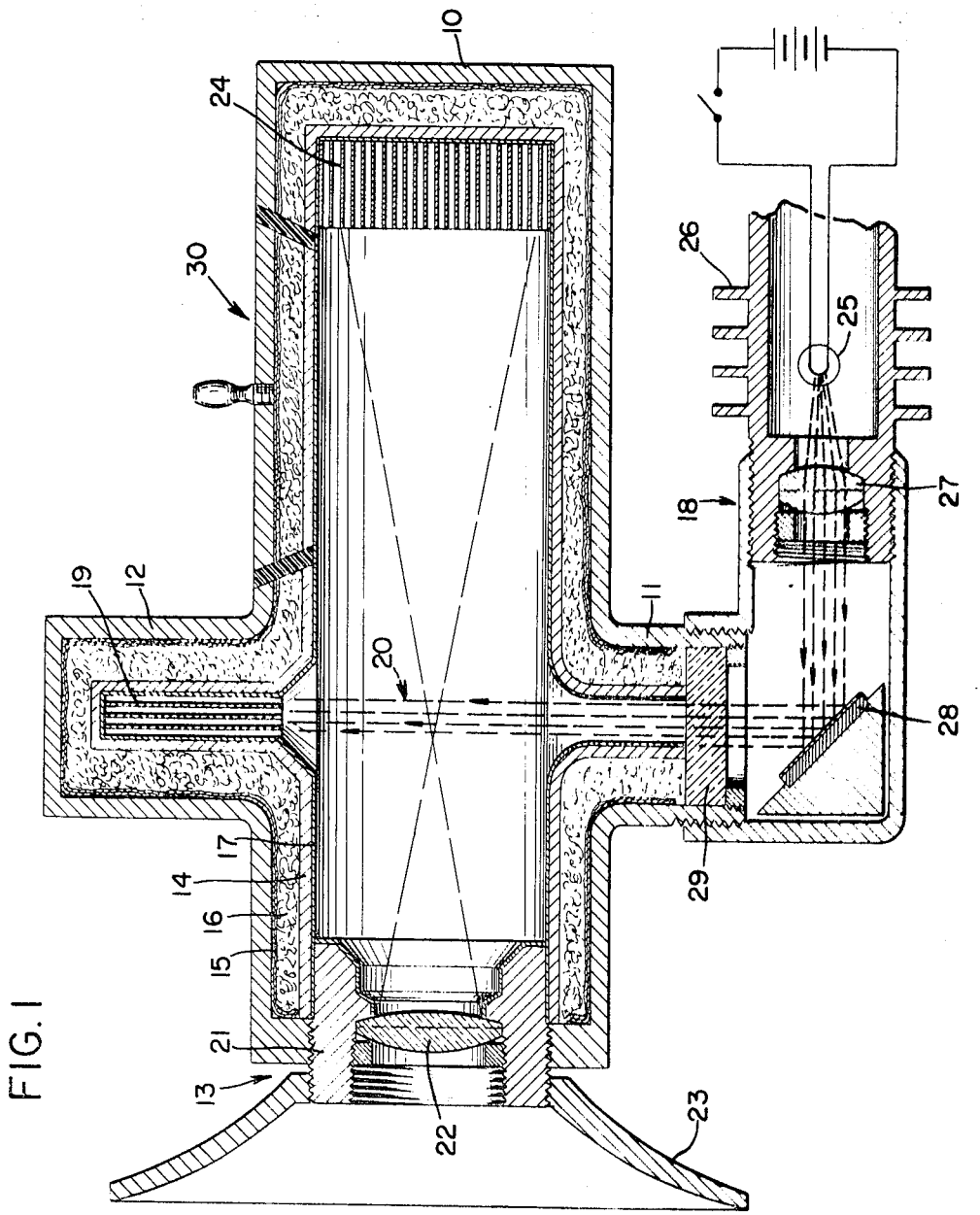

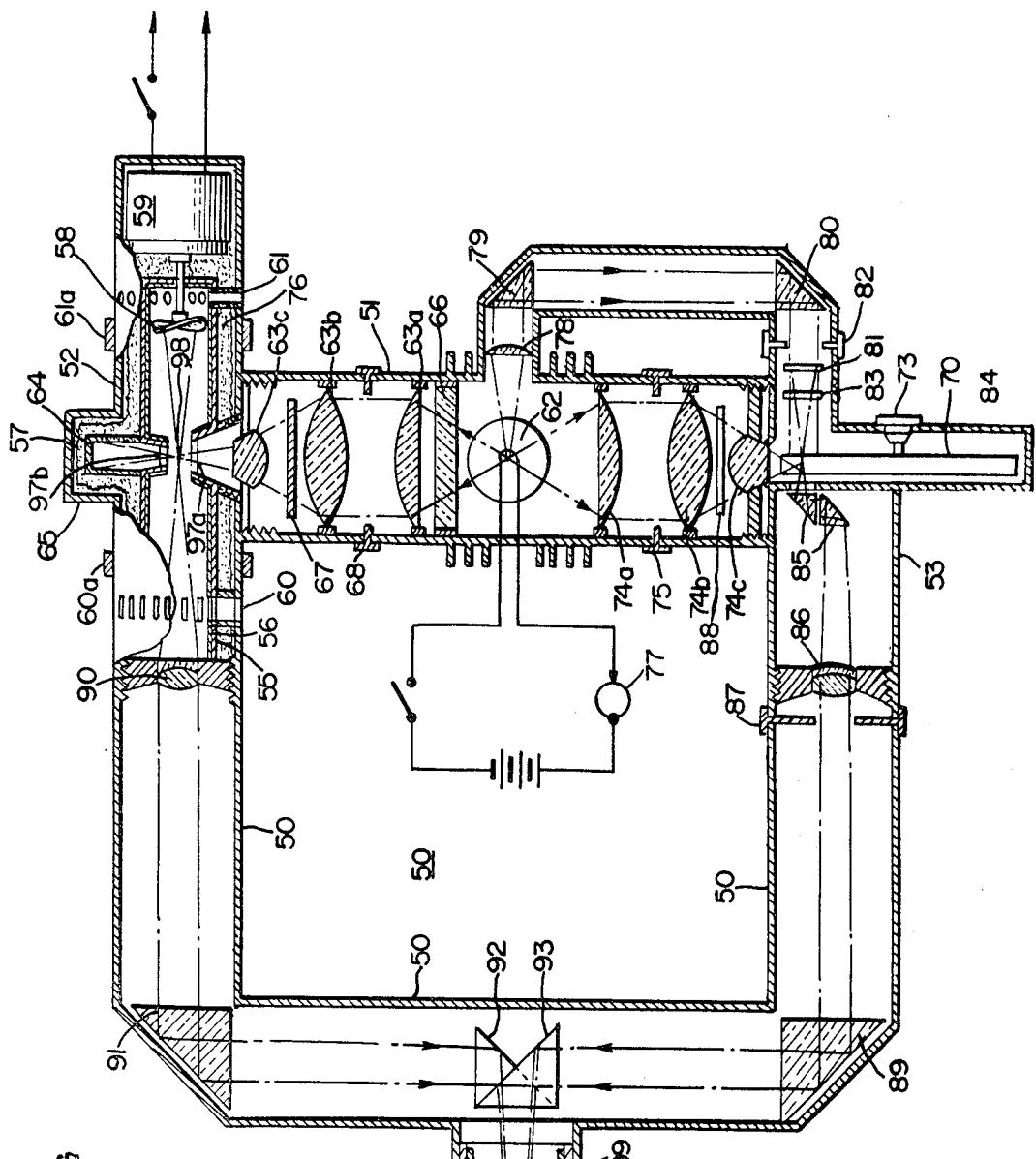

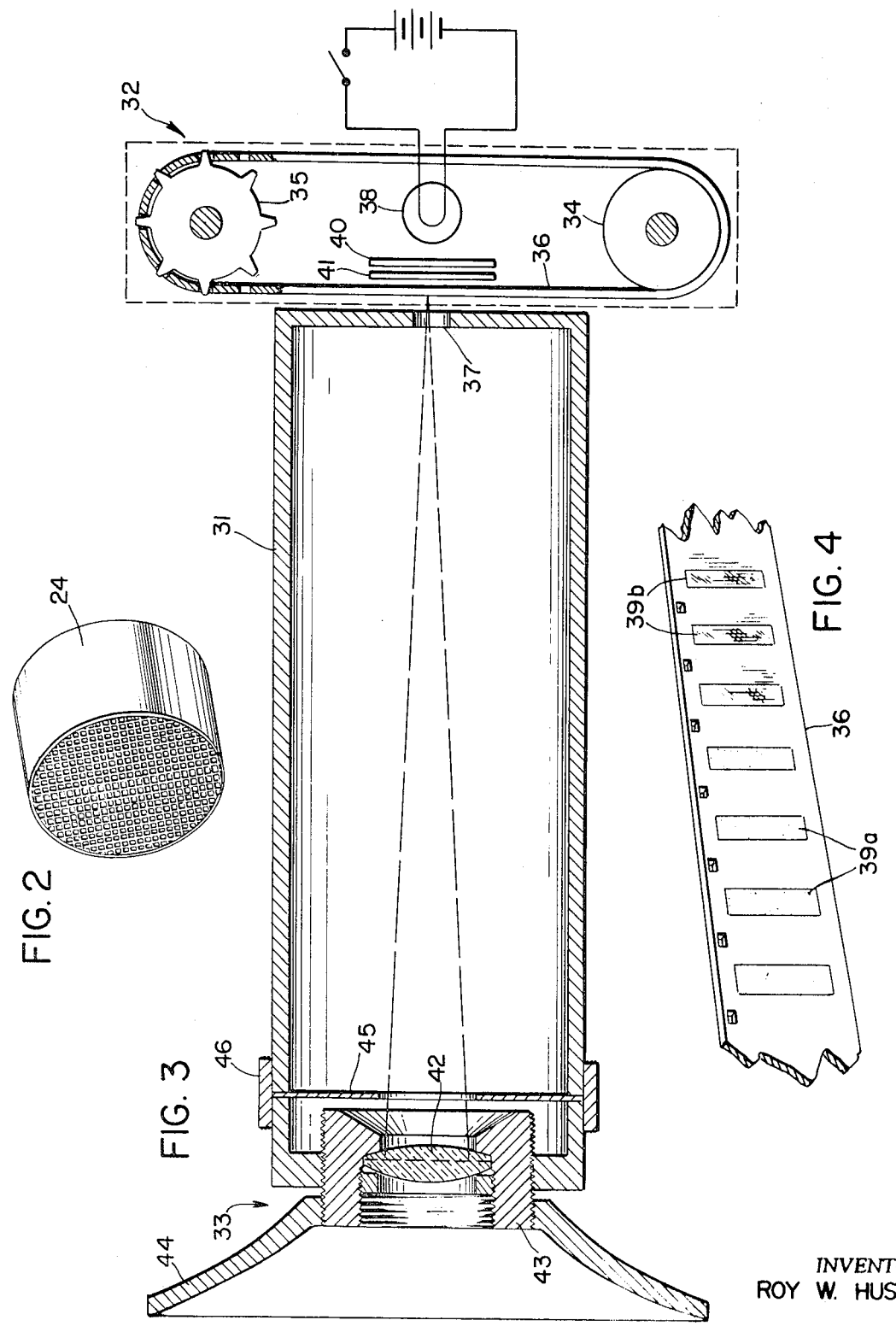

PATENTED NOV 9 1971 3,619,623
SHEET 4 OF 5
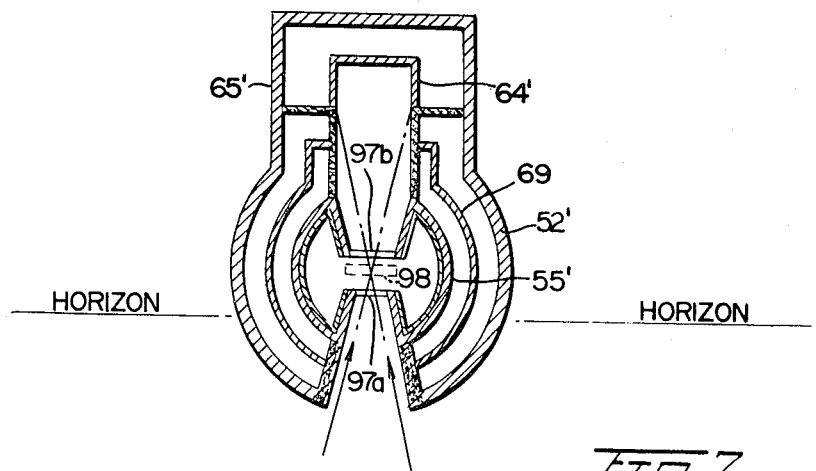
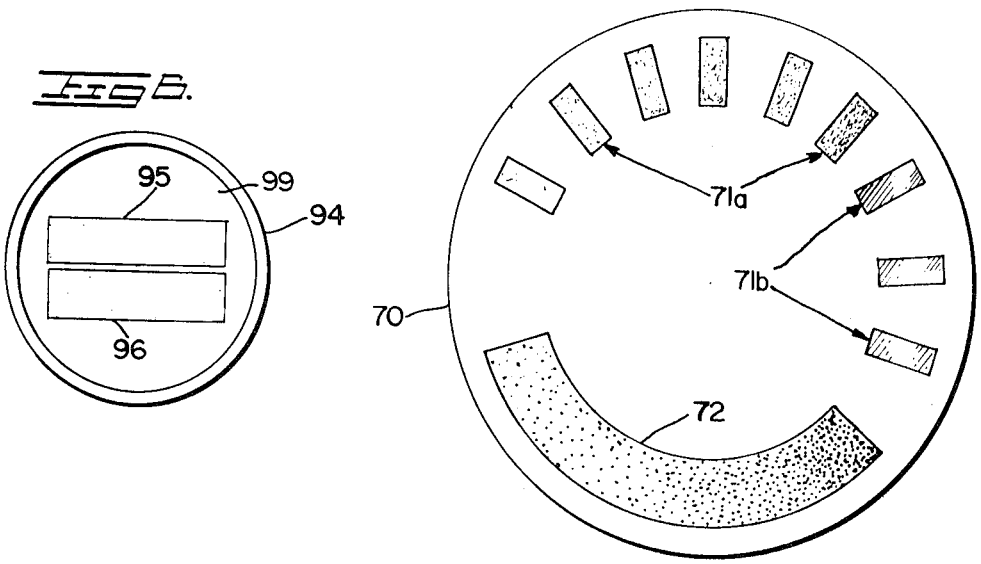
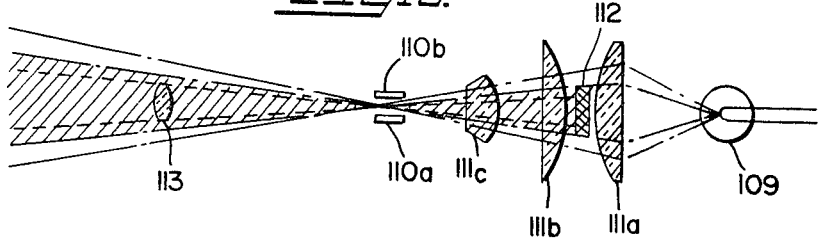
INVENTOR
ROY W. HUSTON
ATTORNEYS

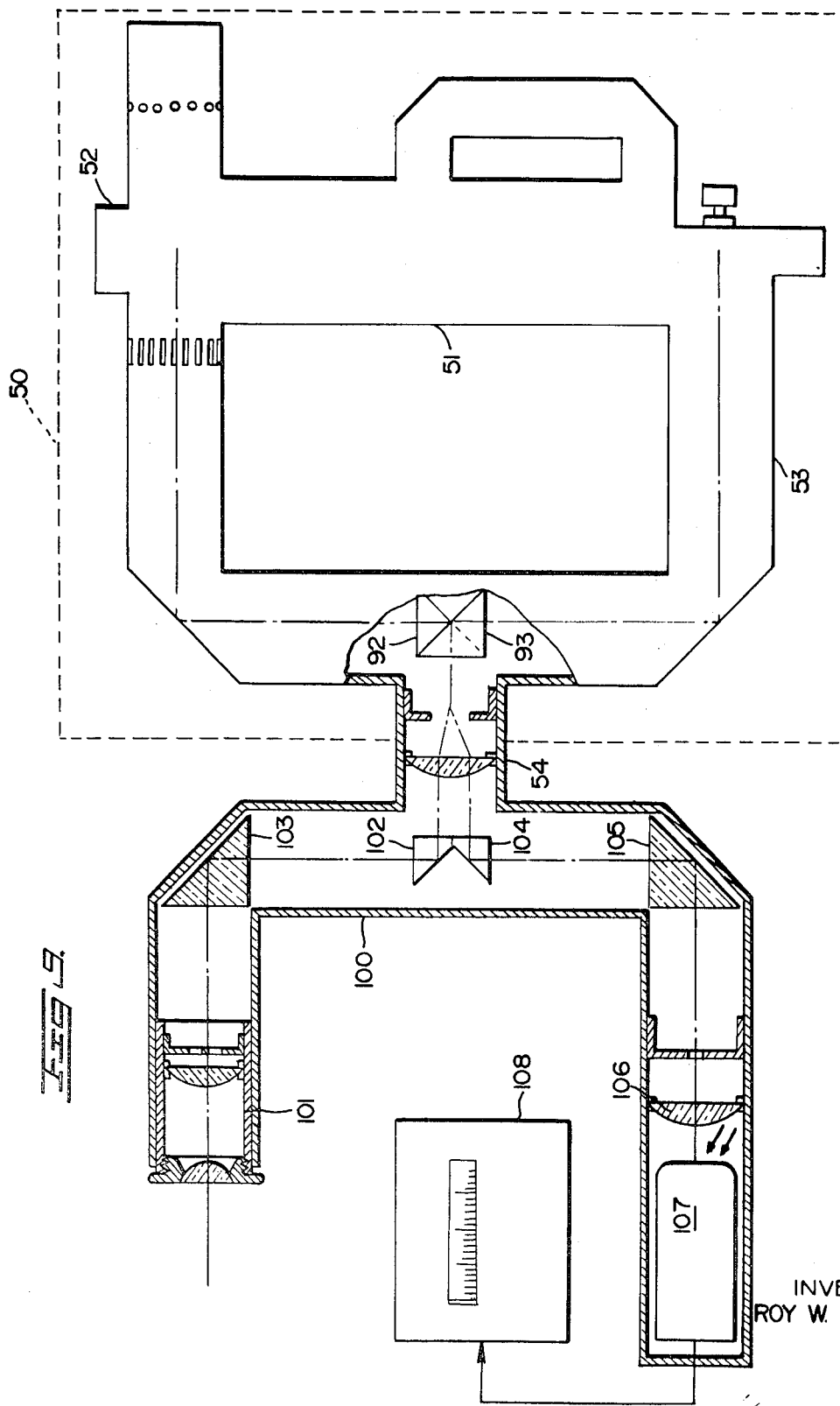

EXAMINATION OF FLUID SUSPENSIONS OF PARTICULATED MATTER

This invention relates to optical apparatus for examining particulate matter suspended in gases and liquids. The apparatus of the invention is of particular usefulness in the visual monitoring of suspensions of particulate matter in the size range from about 5 microns, down to 0.005 microns. Such suspensions are of particular concern in relation to public health and present major problems not only in the maintenance of pleasant and healthful environments but also in contamination control in industrial operations.

Apparatus for monitoring suspended particles using photomultiplier tubes associated with electronic circuits have proposed to count suspended particles or to estimate the total amount of suspended matter in response to light reflected by or scattered from the suspended matter in a beam of light but, at least in the present state of the art, such devices are very limited in their sensitivity and accuracy arising in part from inherent limitations in the photomultiplier response and in part from the very great variations in the nature of the suspended particles, including variations over wide ranges in size, color, shape, specific reflectivity and the like. Also the photodetector cell is inherently incapable of distinguishing between light reflected or scattered from suspended particles and stray light due to reflection and scattering from associated apparatus elements, such as the lenses and diaphragms. Previous work on the Ultramicroscope by Zsigmondy and Siendentopf in the field of Colloid Chemistry, utilizing the Tyndall beam effect, were not concerned with thermal stability, of particles in the sample field. The prime interest was on form, size, color, diffraction effects, Browning motion and other phenomena. The number of particles in a unit volume, when desired was determined by direct count with only a small number showing in the field, (not over four or five particles) or in any one reference grid square. Magnifications considerably higher than those desirable in the present invention were utilized. This invention, in addition to other means, described later, preserves the stability optically by utilizing low magnification. Magnification below 20X is necessary since Browning Motion is clearly observed at this level. This constant motion of particles in addition to thermal convection motion makes comparison with reference standards difficult and inaccurate. Nominal operating magnification for this device is on the order of 10X. Low magnification provides additional benefits such as the ability to view larger sample areas. Larger areas tend to be more representative samples and to give more repeatable results. Low magnification also provides more brilliant images by preserving light, thus facilitating observation.

While experimenting with two artificial reference standards with simulated illuminated particles in a binocular type instrument with a side by side display, applicant discovered that the eye was extremely accurate in making quantity comparisons, being capable of detecting a 10 to 15 percent increase or decrease in one of the reference standards, provided both were visually stable and corrected for visually disturbing dissimilarities such as apparent size, background illumination level and color, particle brilliance and color. Reasonably uniform dispersions are also necessary for high accuracy observations.

It should be noted that particulate samples, on the order of five to 500 individual particles per viewing sample can be compared with high accuracy simultaneously with the associated comparator device without the necessity of the direct count method.

The number of individual particles that can be compared simultaneously is limited only by particle density and sample volume.

A principal object of the present invention is to provide apparatus for the examination of fluid suspensions of particulate matter which takes full advantage of the high sensitivity and the high discriminatory capacity of the human eye while eliminating expensive and bulky electric equipment. This objective is attained by apparatus comprising means defining a thermally stabilized region for containing a sample of the fluid to be examined, means for passing a beam of light into the fluid in the region, optical means for viewing the fluid in the region at an angle to the beam of light. Accuracy of estimation of concentration data of the suspended matter can be improved by associating with the viewer a comparator comprising means for generating visually similar reference standards of simulated particle density for optical viewing in comparison with the view of the particles in the stabilized region. Size data of suspended particles can be estimated by introducing interchangeable light filters of known percentage of transmission characteristics.

Another object of the invention is its use to provide visual comparison when coupled to electronic particle monitoring devices for optical verification of their readout accuracy.

Other objects and advantages of the apparatus for the invention will be apparent from the following description of illustrative embodiments of the invention with reference to the accompanying drawings in which:

FIG. 1 is a transverse section with parts broken away of a viewing device embodying the principles of the invention;

FIG. 2 is a perspective view of a radiation trap suitable for use in the device of FIG. 1;

FIG. 3 is a longitudinal partially diagrammatic section of a comparator device suitable for use with the device of FIG. 1;

FIG. 4 is a fragmentary perspective view of calibration strip suitable for use in the comparator device of FIG. 3;

FIG. 5 is a transverse section of an alternative form of the viewing device of the invention wherein the comparator section and the sample viewing section are mounted in a single carrying frame;

FIG. 6 is an enlarged diagrammatic section of line 6—6 of FIG. 5 showing the view seen in the eyepiece by the operator;

FIG. 7 is an enlarged elevational view of a calibration disc suitable for use in the calibration section of FIG. 5;

FIG. 8 is a section elevation through a modified form of the sample chamber of FIG. 5;

FIG. 9 is a plan view in partial section showing the coupling of an electronic particle monitoring device to the viewing device of the invention; and FIG. 10 is a diagrammatic representation of a modified form of sample viewing arrangement for use in the apparatus of the invention.

Referring to FIGS. 1 and 2, 10 is a cylindrical container having opposite lateral extensions 11 and 12 and an opening at one end for receiving the optical viewing assembly 13. Inside the container 10 is a casing 14 generally spaced from the container to provide a space which may be exteriorly lined with a radiation shield such as aluminum foil 15 and filled with insulating material such as glass wool 16. Casing 14 is a thermally conductive inner radiation shield which may be copper or silver and is covered on its inner surface with a radiation absorbing coating 17 which may be chemically developed or applied as a lacquer.

sidearm 11 of the container is adapted for attachment of an illuminating assembly 18 and sidearm 12 of the container carries a radiation trap 19, mounted in a corresponding sidearm of casing 14, in alignment with the beam of light 20 from illuminating assembly 18.

The viewing assembly 13 comprises a lens holder 21 mounting lens 22 focused at light beam 20 and a flexible eyecup 23 to prevent stray light from entering the viewer. At the opposite end of container 10 from the viewing assembly is a light trap 24, shown in perspective in FIG. 2, providing a radiation absorbing background for the viewer. Radiation traps 19 and 24 are honeycomb structures having a radiation absorbing coating similar to the coating on radiation shield 17.

The illuminating assembly 18 comprises a lamp 25 mounted in a heat radiating housing 26, a collimating lens 27 and front surface mirror 28 projecting the collimated beam from the lamp through infrared radiation absorbing glass plate 29 into the container 10. The lamp 2 may be a tungsten filament lamp, a fluorescent lamp or other source of light.

Access to the container for replacement of samples may be attained by removing the viewing assembly 13 or a door structure 30, constructed similar to the container 10 and associated inner members, may be provided.

It will be seen that the construction of the viewing container is well adapted to minimize energy transfer between the inside of the container and the exterior thus reducing convection currents in the fluid contents of the container and facilitating examination and counting of the suspended particulate matter.

The comparator section of the apparatus shown in FIGS. 3 and 4 comprises a cylindrical container 31 coated on the inside with an energy absorbing coating and carrying at one end a reference standard assembly 32 and at the opposite end an optical viewing assembly 33.

The reference assembly 32 comprises means including support pulley 34 and sprocket wheel 35 for advancing an apertured film strip or metallic ribbon 36 to bring selected apertures into alignment with opening 37 in the end wall of container 31. A lamp 38 provides light for viewing the standards 39a, 39b framed in or mounted on strip 36. A light diffusing member is provided at 40 and interchangeable color correction filters may be inserted at 41.

The optical viewing assembly includes lens 42 carried in adjustable mount 43 for focusing the lens on the reference frames of strip 36 and a flexible eyecup 44. Variable aperture 45 is adjustable by means of ring 46 to balance the light intensity to that of the field of view in the sample viewing section of the apparatus.

As indicated in FIG. 4, the reference frames of strip 36 may carry apertures of varying sizes and concentrations as shown at 39a or may carry translucencies of varying light transmission calibrated for suspensions of diffusing particle content per unit volume as shown at 39b.

In the form of the invention shown in FIG. 5, 50 is a supporting tubular frame comprising an illumination section 51, a sample holding section 52, a comparator section 53 and a viewing section 52, a comparator section 53 and a viewing section 54.

Mounted in the sample holding section 52, which may be lined with a radiation reflecting shield such as aluminum foil 57, is a spaced tubular member 55 of a thermally conductive material, such as copper or silver, establishing a sample space. Tubular member 55, which should be relatively light tight, is covered on its inner surface with a light absorbing coating 56 which may be chemically developed or applied as a lacquer. It is preferable that the viewing background be kept dark as possible so the illuminated sample will stand out in strong contrast. The space between tubular member 55 and the radiation reflecting shield is filled with an insulating material such as glass wool 76.

A fan 58 driven by motor 59 serves to draw a sample of fluid to be examined into member 55 through inlet diffusion holes 60 and force it out through outlets 61, which may be opened and closed by sliding rings 60a and 61a, respectively. A diffusion type inlet has advantages in that it provides a more homogeneous dispersion of particles in the viewing area 98. This facilitates accurate comparison, (see FIG. 6 which illustrates two uniformly dispersed fields, 95 and 96).

A beam of light from lamp 62 in the illumination section is injected into the sample area 98 situated between transparent thermal stabilizing parallel members 97a and 97b through condenser lens system 63a, 63b, 63c and passes into radiation trap 64 in sidearm 65. The interior of the trap is preferably painted black. The lamp 62 which may be a tungsten filament lamp, a fluorescent lamp, laser, or other source of light may operate continuously or be periodically interrupted, for example with a rotating electrical contact 77. The light also passes through a heat filtering glass 66 and size data interchangeable light filter 67 which provides size data by filtering out light from smaller particles. A variable aperture for controlling light intensity and depth of field in the illuminated region is adjustable by means of ring 68. It should be understood that other suitable light condensing and injection means such as lenses, mirrors or fiber optics may be associated with light sources and the transmission of illuminated images.

It is necessary to stabilize the particles in the viewing zone so that comparison with a reference standard is made easy. A thermally stabilized space can be obtained by stabilizing the entire contents of the container 55 or localized thermal stabilization consisting of two parallel spaced members such as 97a and 97b, or a combination of both methods. Tubular member 55 should be made tight to external pressure changes of a local nature as this causes motion of the sample particularly when examining gases.

Parallel spaced members when closely spaced, (4 millimeters or less) rapidly cancel out residual thermal differences so that heat equilibrium between the members is rapidly established. Improved performance is obtained by even closer spacing. Many materials are suitable, metallic, nonmetallic, whether insulating or conducting. The desired effect being obtained principally by proper spacing and to a lesser degree on surface area. More stable performance of the invention is obtained when the stabilizing members are parallel to the earth's horizon. This orientation minimizes heat convection currents, which, when present, rise up vertically between the members. A slight departure from exact parallelism in both stabilizing members and their orientation to the horizon does not introduce serious instabilities; there being a reasonable working range. Turbulence of particles exhibited near the edges of the members is minimized by close spacing and with a suitable light injection design can be kept out of the final view by a reticule such as 99.

Thermal stabilization can be improved by filtering out heat from the light source 62 and further by providing means whereby back radiation in the form of heat is reduced when the incident light energy is dissipated in a heat sink, radiation trap 64 or other suitable means.

In the form illustrated a glass plate 97b functions as one side of the parallel stabilizing members. In addition it seals off radiation trap 64 wherein the incident light energy is dissipated. The trap confines back radiation energy and associated convection currents from reentering and disturbing the thermally stabilized region 98.

An alternative form of the sample holding section is shown in FIG. 8 wherein primed reference numerals denote elements corresponding to those of FIG. 5. The space surrounding sample space forming member 55 is divided by polished metallic tubular member 69 into passages through which the fluid to be viewed is also introduced. This brings both inner 55 and outer 69 structural members rapidly to the sample temperature.

Thermally stabilized regions can be achieved by many different confining structures. Metallic thermally conductive inner structures exhibit the desirable properties of rapid adaptation to various temperatures of sample fluids preventing thermal lag so that excessive delays in sample evaluation are avoided.

It will be seen that the construction of the viewing container 52 is well adapted to minimize energy transfer between the inside of the container and the exterior thus reducing convection currents in the fluid contents of the container which facilitates examination and counting of the suspended particulate matter.

Actual stability of particles or the illusion of stability is what is desired. By providing a periodically interrupted view of the particles the illusion of stability can be reasonably achieved. A pulsed light electrical device 77 or mechanical chopper inserted into the optical train, eyepiece, or light beams would accomplish this. Pulsed viewing is not necessarily limited to the sample holding section. It should be noted that this method of achieving the appearance of stability does not depend on a thermally stabilized region. This method is more suitable for continuously moving fluid fields or for a photographic record of the sample, which information could also be used in conjunction with a reference standard of fluid suspensions.

The comparator section 53, for generating discrete points of light similar in appearance to the sample includes rotation knob and shaft 73 affixed to a circular reference disc 70 of transparent material, shown in more detail in FIG. 7. The disc is enclosed in housing 84, preferably with a blackened interior and is edge illuminated from lamp 62 through condenser lens system 74a, 74b, 74c. Light for providing matching background illumination for the selected reference standard is supplied from lamp 62 through lens 78, prisms 79, 80 and passes through a light diffuser such as ground glass 81. As indicated in FIG. 7 the reference frames of disc 70 may carry individual concentrations of various densities 71a or a gradually graded sequence 72 or may carry translucencies, such as neutral density gelatin filters of varying light transmission, calibrated for suspensions of diffusing particle content per unit volume, (for extremely high particle densities) as shown at 71b. The lower range, 71a or 72, (five to 500 in any one viewing position) reference standards of fluid suspensions of particulate matter can be achieved by illuminating individual surface indentations on the disc 70 or illuminating embedded particles or objects in a transparent matrix arranged in the disc in a graded series or a continuously graded sequence. This generates discrete points of light similar in appearance to the sample. By providing interchangeable artificial particle color correction filters 88 and interchangeable background color filter 83 and matching the background illumination level with aperture 82, (or translucencies 71b) and aperture 75 which adjusts the artificial particle brilliance, it will be seen that all components for displaying a reference standard similar in appearance to the view of the sample are present and adjustable. A suitable objective lens 86, (not necessarily matching the viewing section) completes the reference standard.

Image rotating prisms 85 bring the light from illuminated reference standards into optical alignment with objective 86 in the comparator section 53 which also includes a variable aperture 87.

In operation the view of the sample field in sample holding section 52 is transmitted by objective 90 and prisms 91 and 92 to an adjustable eyepiece 94 in viewing section 54 and the viewed reference standard is transmitted by objective 86 and prisms 89, 93 to eyepiece 94, presenting to the eye of the viewer adjacent images 95, 96 defined by reticle 99 of the viewed sample and the viewed reference standard as diagrammatically represented in FIG. 6. The images may be continuously displayed or periodically interrupted.

The sample field of fluid suspensions and the artificial reference standard images once generated may be used for direct visual information but could be displayed by a variety of means not necessarily in an eyepiece but for example transmitted to a viewing screen or other displaying means or recording device for observation or permanent record.

Strip reference standards as shown in FIG. 4 may be used in the comparator section of the apparatus in FIG. 5 instead of the circular disc 70, or the entire comparator section may be replaced by an independently illuminated assemble of the type shown in FIG. 3.

In the arrangement for verifying and calibrating an electronic particle monitoring device shown in FIG. 9, the viewing device 50 of FIG. 5 is coupled at eyepiece section 54 to a beam splitting section 100. In this section, prisms 102, 103 provide at eyepiece 101 a view of the sample in section 52 together with a view of the selected reference standard in section 53 while prisms 104, 105 and lens 106 transmit to a photosensitive receptor 107, which may be a photomultiplier tube a view of the sample in section 52. The response from 107 is displayed and/or recorded on readout device 108.

The fluid sample optical arrangement diagrammatically illustrated in FIG. 10 provides for viewing the illuminated sample at an acute angle to the illuminating beam. In the arrangement the sample illuminating beam from lamp 109 is focused on the thermally stabilized sample space between stabilizing plates 110a and 110b by lens system 111a, 111b, 111c. An opaque stop 112 in the central portion of the illuminating beam provides a dark central cone in the beam beyond the sample space in which an objective 113 will pick up only light scattered by suspended particles in the sample space, for comparison with reference standards as in the other forms of the invention. In general, it is preferable that, in use, apparatus of the invention in which the sample space is defined by parallel members, (which could be opposed walls of the container as in FIG. 10) be oriented with the members generally parallel to the horizon to minimize the heat generated vertical convection currents in the sample space.

While the illustrative forms of apparatus shown in the drawings include a number of advantageous details of construction, the invention is not limited to such details except as defined in the appended claims.

I claim:

1. Apparatus for the determination of density and distribution of particulate matter suspended in fluid comprising means establishing a region for containing a sample of the particle laden fluid to be examined, means provided for said region for achieving stability of particles in said region, illumination means, means for passing a beam of light from the illumination means into the region, means for viewing the particles in the fluid in the region along an axis angularly divergent from the axis of the light beam, comparator means for viewing a comparator means for viewing a reference standard of fluid suspension of particulate matter connected to and forming an integral part of said viewing means and means whereby the particles in the region and the reference standard can be viewed simultaneously.

2. The apparatus of claim 1 wherein said comparator means is illuminated by light from the illumination means for the region.

3. The apparatus of claim 1 wherein the comparator means has a transparent member embodying a series of graded simulations of particulate matter and means for adjusting the transparent member.

4. The apparatus of claim 1 including a photosensitive monitor and means for transmitting light from the region to said monitor for comparison of the response of said monitor with the selected standard.

5. The apparatus of claim 1 including means for filtering thermal radiation from the beam of light prior to its passage into said region and means for reducing back radiation into said region.

6. The apparatus of claim 1 wherein the means for achieving stability of particles in said region includes thermal barrier controlled wall means constituting the region establishing means and confining the fluid to be examined.

7. The apparatus of claim 1 wherein said means for achieving stability of particles includes a pair of parallel spaced apart and confronting members defining a thermally stabilized space for containing the particle laden fluid during viewing thereof.

8. The apparatus of claim 7 wherein said members are horizontally disposed.

9. The apparatus of claim 1 wherein said means for achieving stability of particles in said region includes means for periodically interrupting the light beam so as to provide a periodically interrupted view of the particles.

* * * * *